BY William W. Stokes
ATTORNEY

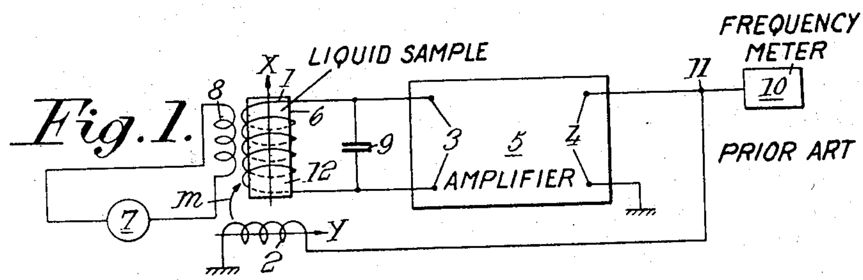
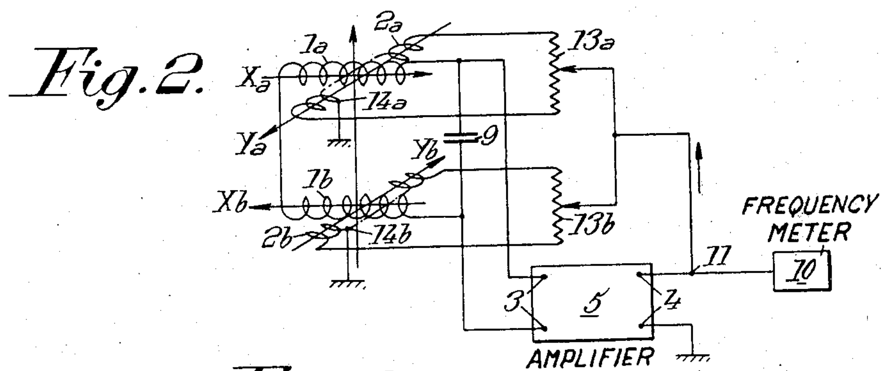
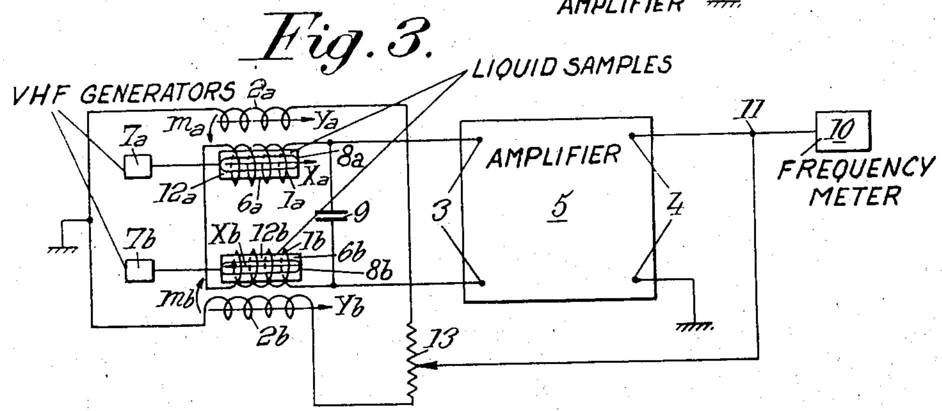
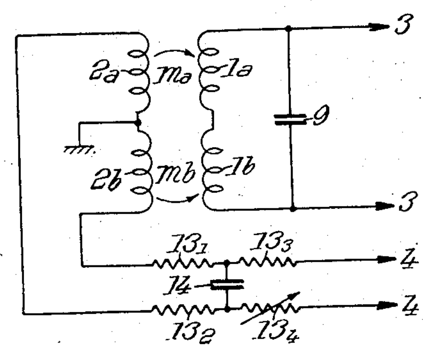
BY William D. Stokes
ATTORNEY

United States Patent Office 3,441,838

Patented Apr. 29, 1969

1

3,441,838

NUCLEAR MAGNETIC RESONANCE MAGNETOMETERS OF THE SPIN COUPLING OSCILLATOR TYPE

Antoine Salvi, Fontaine, France, assignor to Commissariat à l'Energie Atomique, Paris, France, an organization of France Filed Apr. 18, 1966, Ser. No. 543,113
Claims priority, application France, Apr. 22, 1965, 14,225
Int. Cl. G01r 33/00, 33/08
U.S. Cl. 324—.5 5 Claims

ABSTRACT OF THE DISCLOSURE

The magnetometer comprises two vessels containing a solvent including the same atomic nuclei having the same gyromagnetic ratio, and, dissolved in the solvent, a paramagnetic substance which may be the same or different in the two vessels. A pair of excitation coils, fed by the output of a linear amplifier, are wound respectively around the vessels. A pair of pick up coils feeding the input of the amplifier are also wound respectively around the vessels. A frequency meter is connected to the amplifier output for measuring the resonance frequency of the atomic nuclei when the magnetometer is operating in a magnetic field.

The present invention relates to nuclear magnetic resonance magnetometers of the spin oscillator type, that is to say including two Bloch coils connected respectively to the input and to the output of a linear amplifier. The invention is more especially, but not exclusively, concerned with magnetometers of this kind intended to measure with a high accuracy (higher than $10^{-5}$ oersteds) a weak magnetic field such as the terrestrial magnetic field (the intensity of which is of the order of magnitude of 0.5 oersted), in particular on board of an aircraft or a rocket.

The chief object of the present invention is to make a magnetometer of this kind which is not sensitive to external electromagnetic fields, on the one hand, and to the effects of a fast displacement in the magnetic field to be measured, on the other hand.

According to the prior practice a spin coupling oscillator type magnetometer comprises two Bloch coils wound about a vessel containing a sample of a material having gyromagnetic properties, the first of these coils being connected to the input and the second coil to the output of a substantially linear amplifier having its output connected to a frequency meter which determines the frequency of the output voltage of the amplifier, which is proportional to the intensity of the magnetic field in which the vessel is located.

Contrary to this practice, a magnetometer according to the present invention comprises, in combination:

A pair of vessels containing each a sample of a material having gyromagnetic properties;

A substantially linear amplifier;

Two pairs of coils, the first pair being connected to the input of said amplifier and the second pair to the output of said amplifier, the two coils of each pair being substantially identical to each other and wound, about parallel axes, about the respective vessels, in such manner that, at the input of the amplifier, the electromotive forces induced by the nuclear magnetic resonance in the two coils connected with this input are added to each other, whereas the electromotive forces which might be induced in these two coils both by possible external electromagnetic fields and by possible displacements of the magnetometer in the magnetic field to be measured are opposed to each other and cancel each other; and A frequency meter also connected to the output of said amplifier.

In a first kind of embodiment, the two coils wound about the same vessel, one being connected to the input and the other to the output of the amplifier, and said coils being normally decoupled with respect to each other, are disposed with their respective axes at right angles to each other, the two liquid samples containing, on the one hand, a solvent with atomic nuclei having a magnetic moment and a kinetic momentum both different from zero, therefore having a well defined gyromagnetic ratio, and, on the other hand, dissolved in this solvent, a paramagnetic substance, in particular a free ion or radical with an unpaired electron having at least one electronic resonance line saturable by an electromagnetic field of non zero frequency even in a magnetic field tending toward zero, means being provided for producing this electromagnetic field at the electronic resonance frequency to saturate said line in the two samples, which are substantially identical.

In a second kind of embodiment, the two coils wound about the same vessel are disposed with their axes parallel to each other, the coupling coefficients being opposed for the two samples, which are of the above cited type with atomic nuclei having a well defined gyromagnetic ratio and a dissolved paramagnetic substance, the whole of the two samples, which are either substantially identical or different (but then containing the same atomic nuclei in the solvent) comprising two electronic resonance lines either of different frequencies or of the same frequency, saturation of one of said lines producing an increase of the absorption of energy at the nuclear resonance frequency of said atomic nuclei, whereas saturation of the other line produces the stimulated emission of energy at said nuclear resonance frequency, means being provided for producing in each sample an electromagnetic field at the frequency of one electronic resonance line in order to saturate for the whole of the two samples the two above mentioned electronic resonance lines.

Preferred embodiments of the present invention will be hereinafter described with reference to the appended drawings, given merely by way of example, and in which:

FIG. 1 of these drawings diagrammatically shows a spin coupling oscillator of a known type;

FIG. 2 shows the application of the improvements according to the present invention to a spin coupling oscillator, this embodiment including crossed coils wound about each of the vessels;

FIG. 3 shows the application of the improvements according to the present invention to a spin coupling oscillator where the two coils wound about each vessel are parallel to each other;

FIG. 4 shows a modification of the device of FIG. 3;

Figure 5:
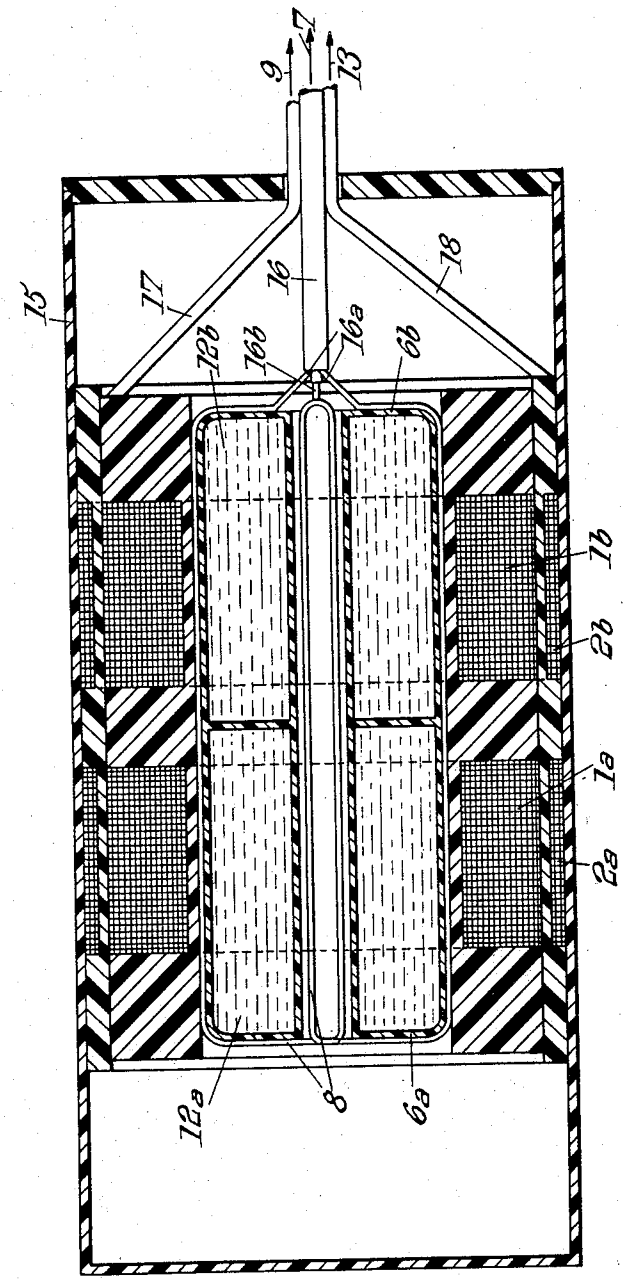
FIG. 5 is a sectional view through a measurement head with parallel coils.

It will be supposed, by way of example, that it is desired to provide a magnetometer which is not sensitive to external electromagnetic fields nor to fast displacements of the magnetometer in the magnetic field to be measured.

Before describing the improvements according to the present invention, mention will be made, with reference to FIG. 1, of the structure and operation of known magnetometers of the spin oscillator type.

Such an oscillator, described for instance in the French Patent No. 1,351,587 of Dec. 28, 1962 and in the U.S. patent application Ser. No. 333,901 of Dec. 27, 1963, especially comprises two Bloch coils 1 and 2 connected respectively to the input 3 and the output 4 of a linear amplifier 5. Coils 1 and 2 are electromagnetically decoupled as well as possible, the directions X, Y of their axes being perpendicular to each other.

Coils 1 and 2 are wound about a vessel 6 containing a liquid sample 12 consisting of:

A solvent containing atomic nuclei (in particular protons having a non zero magnetic moment and a non zero kinetic momentum, that is to say having a gyromagnetic ratio $\gamma$, the resonance frequency $f$ of these atomic nuclei in a magnetic field of an intensity equal to H being given by the formula:

$$f=\frac{\gamma}{2\pi}H$$

A paramagnetic substance dissolved in this solvent, this substance containing in its molecule an unpaired electron in interaction with an atomic nucleus of said substance (thus, in the case where the free radical consists of nitrosodisulfonate $NO(SO_3)_2$, there exists a single dipolar coupling between the electronic spin of the NO ion and the spin of the nuclei of the solvent), the substance having a saturable electronic resonance line of non zero frequency in a zero magnetic field.

The magnetometer also comprises means for saturating this electronic resonance line constituted by a VHF generator 7 at the frequency of this line (which is of the order of 55 megacycles per second in the case of nitrosodisulfonate) and a coil 8 fed from this generator and dipping in the liquid sample 12 inside vessel 6. (In order to facilitate the reading of FIG. 1, coils 2 and 8 have been shown at a distance from vessel 6.)

An electromagnetic screen (not shown) is provided between the coil 8 dipping in vessel 6 on the one hand and coils 1 and 2 surrounding vessel 6 on the other hand, this screen being transparent at the nuclear resonance frequecy and opaque at the electroic resonance frequency.

Furthermore, there is provided a capacitor 9 disposed across the terminals of coil 1 to constitute therewith a resonant circuit tuned to the nuclear resonance frequency $f$ and having a quality coefficient Q of low value (of the order of 5) to reduce the pulling that would take place if Q were too high.

Finally a frequency meter 10 is disposed at the output 4 of amplifier 5 to measure the nuclear resonance frequency or Larmor frequency $f$, which frequency meter 10 may be directly graduated in magnetic field intensities, because $H=2\pi f/\gamma$.

In operation, saturation of the electronic resonance line produces a population reversal of the nuclear spins in the sample of vessel 6, whence a stimulated emission of energy at the nuclear resonance frequency by the nuclear spins returning to the lower level. This stimulated emission produces a moment rotating at the nuclear resonance frequency (about 2,000 cycles per second for proton in the terrestrial magnetic field), which ensures a substantial coupling between coils 1 and 2 (normally decoupled), but at this frequency. There is thus obtained a reaction oscillator wherein the nuclear resonance curve which is relatively sharp (because the nuclear resonance lines are narrow) plays the same part as the resonance curve of an oscillatory circuit in a conventional reaction oscillator, the hook-in condition, and therefore the condition for an effective operation, being that the amplification of amplifier 5 exceeds a predetermined limit which may be calculated for each spin coupling oscillator (account should also be taken of the fact that a portion of the energy of the oscillator is collected at 11 to be transmitted to frequency meter 10).

Such a magnetometer gives execellent results but its measurements, as a rule accurate, are disturbed, in consequence of the fact that coil 1 comprises a great number of turns (for instance 6,000 turns), by two phenomenons:

Coil 1 presents a large area to the external electromagnetic fields, and consequently, these fields induce in the coil parasitic electromagnetic forces which are added to the nuclear resonance electromotive force of small amplitude (of the order of 50$\mu$V across the terminals of coil 1); as amplifier 5 is not perfectly linear, it transforms the input resultant voltage in frequency modulations, because the lack of linearity introduces, into the output of the amplifier, frequencies (harmonics) which do not exist at the input, and finally there exists at 11 aleatory beats which cannot be eliminated by frequency meter 10.

The magnetic flux interesected by coil 1 in the displacement of the magnetometer (when the latter is located on board an aircraft for instance) creates therein an electromotive force within the band of frequencies of resonating circuit 1, 9, which produces aleatory noises at the output of amplifier 5 and therefore at the input 11 of frequency meter 10, which noises may be interpreted by the frequency meter as variations of the magnetic field of the order of magnitude of $10^{-5}$ oersted.

These two phenomenons limit the accuracy of the spin oscillator type magnetometer illustrated by FIG. 1 which, otherwise (in the absence of any external electromagnetic field and of quick displacements), is satisfactory.

In order to obviate these drawbacks, according to the invention, there is provided in a magnetometer (FIGS. 2 to 4), in combination:

A pair of vessels 6*a*, 6*b* (shown only in FIG. 3 in order to simplify FIGS. 2 and 4) each containing a sample 12*a*, 12*b* having gyromagnetic properties, a substantially linear amplifier 5' (shown only in FIGS. 2 and 3), two pairs of coils, the first pair 1*a*–1*b* being connected to the input 3 of amplifier 5 and the second pair 2*a*–2*b* being connected to the output 4 of this amplifier, the two coils of a pair being identical to each other and wound about axes *Xa*–*Xb*, *Ya*–*Yb* which are parallel, about one vessel 6, whereby at the input 3 of amplifier 5 the electromotive forces in coils 1*a*, 1*b* (connected to this input) by the nuclear resonance are added to each other, whereas the electromotive forces which might be induced in these two coils 1*a*, 1*b* both by external electromotive fields and by displacements of the magnetometer in the magnetic field to be measured are opposed to each other and cancel each other, and a frequency meter 10 (not shown in FIG. 4) also connected to the output of amplifier 5 to measure the frequency of the voltage delivered by this amplifier, which is strictly proportional to the intensity of the magnetic field in which the piar of vessels 6*a*–6*b* is placed.

The invention includes both spin coupling oscillators where the pairs of coils are crossed, that is to say have their axes perpendicular to each other, and also oscillators where the pairs of coils are parallel.

Thus in a first kind of embodiment, the two coils 1*a*–2*a* or 1*b*–2*b* wound about the same vessel are crossed, their axes *Xa*, *Ya* on the one hand and *Xb*–*Yb* on the other hand being perpendicular to each, as illustrated by FIG. 2, whereas, in a second kind of embodiment, the coils 1*a*–2*a* or 1*b*–2*b* wound about the same vessel, and consequently the four coils, are parallel as shown by FIGS. 3 and 4.

For the sake of simplification, FIG. 2 does not show the two vessels containing the gyromagnetic samples about which are respectively wound coils 1*a* and 2*a* and coils 1*b* and 2*b*, nor the VHF generators and the coils (corresponding to elements 7 and 8 of FIG. 1) to saturate an electronic resonance line of each sample of material. FIG. 2 shows capacitor 9 forming with coils 1*a*, 1*b* a resonant circuit tuned to the nuclear resonance frequency and amplifier 5 to the input 3 of which coils 1*a* and 1*b* in series with each other are connected and to one of the output terminals 4 of which are connected, through adjustment potentiometers 13*a* and 13*b*, coils 2*a* and 2*b* the middle points 14*a*, 14*b* of which are grounded, same as the other output terminal of the amplifier. This FIG. 2 also shows the measurement frequency meter 10 connected at 11.

Initially, potentiometers 13*a* and 13*b* are adjusted in such manner that in the absence of a magnetic field, a decoupling as perfect as possible is obtained between crossed coils 1*a* and 2*a* and between crossed coils 1*b* and 2*b*.

In the absence of a magnetic field, and receiving coils 1*a*, 1*b* being close to each other, parallel to each other, substantially identical to each other and wound in opposed directions, any possible surrounding electromagnetic field and/or the flux intersected by a possible displacement of the magnetometer create in each of the receiving coils 1*a*, 1*b* respective electromotive forces which are opposed and cancel each other. Thus all parasitic induction noises are eliminated and the oscillator does not deliver anything into frequency meter 10.

On the contrary, in the presence of a magnetic field of intensity H, a coupling takes place between coils 1*a*, 2*a* on the one hand and between 1*b*, 2*b* on the other hand at frequency $$f=\frac{\gamma}{2\pi}H$$

($\gamma$ being the gyromagnetic ratio of the useful atomic nuclei, supposed to be the same, of the solvent of the two samples). As exciting coils 2*a*, 2*b* have anti-parallel axes Y*a*, Y*b*, a phase shifting of $\pi$ is produced between the two nuclear induction electromotive forces and, as receiving coils 1*a*, 1*b* also have anti-parallel axes X*a*, X*b*, a second shifting of $\pi$ is produced in the circuit of these coils 1*a*, 1*b* and the electromotive forces induced by the nuclear resonance in these two coils 1*a*, 1*b* are added to each other at the terminals of capacitor 9 and amplifier 5.

Therefore, at the input 3 of amplifier 5, the same nuclear resonance signal of frequency $f$ is obtained in the arrangement of FIG. 2, including two receiver coils, as in the arrangement of FIG. 1 where there is a single receiver coil, but the parasitic signals are eliminated in the arrangement of FIG. 2. Thus, with a magnetometer wherein coils 1*a*, 1*b* included each 3,000 turns and coils 2*a*, 2*b* included each 100 turns and where the sample consisted of a deoxygenated aqueous solution of nitrosodisulfonate one electronic resonance line at 55 megacycles per second was saturated, or of a deoxygenated aqueous solution of di-tertio-butyl-nitroxide $$N[C(CH_3)_3]_2$$

one electronic resonance line at 72.5 megacycles per second was saturated, the following results were obtained: the variations of the terrestrial field were measured with an accuracy higher than $1.10^{-6}$ oersted, the magnetometer being placed on board an aircraft (Bréquet Atlantic 1150).

The spin coupling oscillators with crossed coils of the type illustrated by FIGS. 1 and 2 permit a nearly perfect decoupling, by construction, of the energizing coils 1, 1*a*–1*b* and of the receiving coils 2, 2*a*, 2*b*.

One of the advantages of this decoupling is that it permits the operation of the nuclear oscillator within a wide band of frequencies because the quality coefficient Q of the input resonating circuit 1, 9 or 1*a*–1*b*–9 may be low so that pulling is reduced (see on this subject the communication of MM. Grivet, Blaquiére and Bonnet in the proceedings of the 3rd International Conference of Quantic Electronics-Dunod, Paris 1964, tome I, pp. 239 to 246).

On the other hand, the use of crossed coils introduces two forbidden axes (those of the coils) instead of the single one in the case of the magnetometer of the maser type with dynamic polarization described in the French Patent No. 1,177,112 of June 1, 1957 and in the above cited communication pp. 235 and 236.

If the addition of a forbidden axis is generally not an inconvenience in the case of a magnetometer mounted stationary on the ground (when the direction of the magnetic field to be measured is substantially constant) or even for a magnetovariometer on board of an aircraft the displacements of which do not cause one of the forbidden axes to coincide with the direction of the magnetic field, the same is no longer true for an aircraft flying without special precautions. Thus a standard aircraft turn (360° in two minutes) inclines the magnetometer by about 25° and any measurement becomes doubtful when this inclination is added to that of the terrestrial magnetic field.

Therefore, in the pracitce of measurement on board of an aircraft, the measurement head (vessel or vessels and coils) is stabilized along the vertical axis (so that the forbidden axes of the coils are horizontal).

In the second type of embodiment, illustrated by FIGS. 3 and 4, where the four coils are parallel together, there exists only one forbidden axis, which is that of the coils. It then suffices, on board the aircraft, to have this single forbidden axis coinciding with the axis of the aircraft.

In the embodiment of FIG. 3, the receiver coils 1*a*, 1*b* are mounted, as in the embodiment of FIG. 2, with their respective axes parallel but opposed in direction, which eliminates by compensation (as in the case of FIG. 2) the electromotive forces induced in these coils by the external electromagnetic field and the displacements of the magnetometer. On the contrary, the exciting coils 2*a*, 2*b* are mounted in series, with their axes parallel to the axes of coils 1*a*, 1*b*. The axis of coil 2*a* is in the same direction as the axis of coil 1*a*, and the axis of coil 2*b* is in the opposite direction to the axis of coil 1*b*. As the two coils 2*a* and 1*a* on the one hand and 2*b* and 1*b* on the other hand are not decoupled, the coefficients of coupling by induction $m_a$ between coils 2*a* and 1*a* and $m_b$ between coils 2*b* and 1*b* are made such that $m_b=-m_a$. The cancelling by each other of the electromotive forces induced across the terminals of the input 3 of amplifier 5 is achieved by means of adjusting potentiometer 13.

In order to obtain that the electromotive forces of nuclear origin induced in the two receiver coils 1*a*, 1*b* are added to each other at the input terminals 3 of amplifier 5 it is necessary that the macroscopic resultants of the magnetic moments of the whole of the atomic nuclei of the two samples be in phase opposition, because the two coils 1*a* and 1*b* are wound in opposed directions and the couplings between the two coils 1*a*, 2*b* on the one hand, 1*b*, 2*b* on the other hand, are imposed by construction.

Opposition of the two macroscopic components is ensured by bringing into play in the two samples two electronic resonance lines (having different frequencies or substantially identical frequencies) of the dissolved paramagnetic substance, such that saturation of one of them in sample 12*a*, by means of a VHF generator 7*a* and of a coil 8*a* (represented by a single turn in order to simplify the drawings) connected to this generator and dipping in sample 12*a*, produces a macroscopic component in a first direction, whereas saturation of the other line in sample 12*b*, by means of a generator 7*b* and of a coil 8*b* (represented by single turn in order to simplify the drawing) connected with said generators 7*b* and dipping in sample 12*b*, produces a macroscopic component in a second direction, opposed to the first one.

In other words, saturation of one of the electronic resonance lines must produce an increase of the intensity of the energy absorption at the frequency of this line, whereas saturation of the other electronic resonance line must produce a stimulation of energy (following a reversal of population of the nuclear spins resulting from a reversal population of the electronic spins and from the coupling between these two kinds of spins) at the frequency of this other line.

For this purpose, it is possible, first to choose the same paramagnetic substance for both of the samples 12*a*, 12*b*, this substance consisting of a free radical comprising two electronic resonance lines one of which gives by saturation an emission of energy and the other an absorption of energy. In this case, it is necessary to provide two VHF generators 7*a*, 7*b* working at different frequencies. This is the case for instance for nitrosodisulfonate which has two lines, at 53.5 and 55.9 megacycles per second, respectively, in the terrestrial field or for di-tertio-butyl-nitroxide which has two lines at 69.4 and 72 megacycles per second, respectively, in the terrestrial field, which correspond to macroscopic resultants of opposite signs.

It is also possible to bring into play two paramagnetic substances for which the same frequency energizes two reversed electronic lines (a line of each substance). In this case a single VHF generator is sufficient for feeding two coils dipping in vessels 6_a_ and 6_b_ respectively to energize the two resonance lines at the same frequency. There has been discovered a pair of paramagnetic radicals complying with this conditilon, to wit di-tertio-butyl-nitroxide dissolved in a solvent consisting of half water and half acetone (in volume) and triacetoneamine nitroxide dissolved in a solvent consisting of seven portions of water and three portions of ethylene glycol for which the application of a VHF field at 68.5 megacycles per second saturates, for the first one, a lower electronic resonance line (whence an increase of the energy absorption) and for the second one, a higher electronic energy line (thence stimulated emission of energy).

In both cases, instead of two energizing coils dipping in vessels 6_a_, 6_b_, it will be possible to bring into play two coaxial cavities filled with the two samples respectively, these cavities being of the type described and illustrated in the French Patent No. 1,358,352 of July 18, 1960.

It has also been discovered that another suitable pair of paramagnetic radicals consists of triacetoneamine nitroxide, as above mentioned, and "tanoxine" or tetramethyl 2,2,6,6-azo-1-cyclohexanoneoxime-4-oxide-1 the formula of which is $NO[C(CH_3)_2CH_2]_2C{=}NOH$, as mentioned in the French Patent of addition No. 84,349 filed Sept. 13, 1963.

FIG. 4 diagrammatically illustrates the symmetrical re-injection either with one paramagnetic radical or with two paramagnetic radicals. This figure shows coils 1_a_ and 2_a_ with a coupling coefficient $m_a$, coils 1_b_ and 2_b_ with a coupling coefficient $m_b = -m_a$ and tuning capacitor 9. Four resistances $\mathbf{13}_1 = \frac{1}{2}r$, $\mathbf{13}_2 = \frac{1}{2}r$, $\mathbf{13}_3 = R_0$ and $\mathbf{13}_4 = R$ (variable) replace potentiometer 13_a_, a capacitor 14 being provided to increase the narrowness of the resonance band.

FIG. 5 illustrates a measurement head which comprises axial coils, as in the case of FIG. 4, this head having the advantage of a reduced total volume.

The same reference numerals have been used in FIG. 5 as in the other figures to designate the corresponding elements.

The measurement head is housed in a casing 15 which does not form a shield with respect to the magnetic field to be measured. It comprises a double vessel formed by two compartments 6_a_ and 6_b_ for the two samples 12_a_, 12_b_, consisting respectively of an aqueous solution of a concentration of M/1600 of triacetoneamine nitroxide and a solution, in fifty percent in volume of water and fifty percent in volume of acetone, of di-tertio-butyl-nitroxide of a concentration of M/800. Saturation of the electronic resonance lines or bands at 68.5 megacycles per second for the two samples is obtained by means of some turns 8 acted upon by a generator 7 (not shown) through a coaxial cable 16 the conductors of which are 16_a_ and 16_b_.

About compartments 6_a_, 6_b_ are disposed, on the one hand, the coils 1_a_, 1_b_ for collecting the voltage at the nuclear resonance frequency, these coils being connected in series between the terminals of a capacitor 9 (not shown) by a cable 17 and, on the other hand the injection coils 2_a_, 2_b_ connected in shunt, between the ground and a system of resistances 13 of the type illustrated by FIG 4, by means of a cable 18. For instance, coils 1_a_, 1_b_ may comprise 4,000 turns of a diameter of 30 hundredths of a millimeter and coils 2_a_, 2_b_ about 250 turns of a diameter of 30 hundredths of a millimeter.

This magnetic resonance magnetometer has over the already existing magnetometers of the spin coupling oscillator type many advantages among which the following may be cited:

It permits of measuring low magnetic fields, such as the terrestrial magnetic fields, with a high accuracy both with a stationary apparatus and with an apparatus mounted on an aircraft, a rocket or a space machine.

Its indications are uninfluenced by possible displacements.

Its indications are uninfluenced by external electromagnetic fields.

What I claim is:

1. A magnetometer comprising in combination:

a pair of vessels located in the same vicinity so as to be able to be placed in the same ambient magnetic field, each of said vessels containing a solvent including atomic nuclei having a given gyromagnetic ratio thereby permitting nuclear magnetic resonance and, dissolved in said solvent, a paramagnetic substance having at least one electronic resonance line saturable by an electromagnetic field of non-zero frequency even in a magnetic field of vanishing intensity, the atomic nuclei and hence the gyromagnetic ratio in one of said vessels being respectively the same as the atomic nuclei and the gyromagnetic ratio in the other of said vessels;

saturating means for saturating said electronic resonance line of the paramagnetic substance in each vessel of said pair;

a substantially linear amplifier having an input and an output;

a pair of excitation coils fed by said output, each of said excitation coils being located around a respective vessel of said pair of vessels for inducing nuclear magnetic resonance in the solvent of said vessel;

a pair of pick-up coils feeding said input, decoupled from one another, each of said pick-up coils being located around a respective vessel of said pair of vessels, for picking-up the magnetic resonance signal generated in the solvent of said vessel:

the two pick-up coils being substantially identical to each other and wound in opposite directions around respective axes which are parallel to each other so that at said amplifier input, the electromotive forces induced in said pair of pick-up coils by the nuclear magnetic resonance are added to each other, whereas the parasitic electromotive forces liable to be induced in said pair of pick-up coils both by parasitic electromagnetic fields and by displacements of the magnetometer cancel each other, being of same strength but of opposed polarity;

and a frequency meter connected to a said amplifier output for measuring the frequency of the electromagnetic forces induced in said pair of pick-up coils.

2. Magnetometer according to claim 1, wherein:

the paramagnetic substance dissolved in one of said vessels is the same as the paramagnetic substance dissolved in the other of said vessels, said saturating means saturate the same resonance line of said paramagnetic substance in both vessels of the pair, and the two coils, one from the pair of excitation coils and one from the pair of pick-up coils, located around the same vessel are wound around axes substantially perpendicular to each other, the two pick-up coils being substantially identical to each other and wound in opposite directions around respective axes which are parallel to each other.

3. Magnetometer according to claim 1, wherein the saturation of the electronic resonance line of the solvent in one vessel produces an increase of the absorption of energy at the nuclear resonance frequency of said atomic nuclei of said solvent in the magnetic field in which they are located, whereas saturation of the electronic resonance line of the solvent in the other vessel produces simulated emission of energy at said nuclear resonance frequency; the two excitation coils being substantially identical and wound in the same direction around respective axes parallel to the axes around which are wound the two pick-up coils.

4. Magnetometer according to claim 3, wherein:

each of said vessels contains di-tertio-butyl-nitroxide, as paramagnetic substance, dissolved in a solvent consisting of about 35% of acetone and about 65% of water;

and said saturating means saturate a resonance line at substantially 69.4 megacycles per second in one vessel and a resonance line at a frequency of substantially 72 megacycles per second in the other vessel.

5. Magnetometer according to claim 3, wherein:

one of said vessels contains di-tertio-butyl-nitroxide, as paramagnetic substance, dissolved in a solvent consisting of about one half of water and about one half of acetone, whereas the other of said vessels contains triacetonamine nitroxide, as paramagnetic substance, dissolved in a solvent consisting of about seven parts of water and three parts of ethylene glycol, the atomic nuclei in both these solvents being protons;

and said saturating means saturate a resonance line of a frequency of substantially 68.5 megacycles per second in both vessels of said pair.

References Cited

UNITED STATES PATENTS

| | | | |
|---|---|---|---|
| 3,145,336 | 8/1964 | Bonnet | 324—.5 |
| 3,166,707 | 1/1965 | Bonnet | 324—.5 |
| 3,249,856 | 5/1966 | Le Maire | 324—.5 |

RUDOLPH V. ROLINEC, *Primary Examiner.*

MICHAEL J. LYNCH, *Assistant Examiner.*

UNITED STATES PATENT OFFICE

CERTIFICATE OF CORRECTION

Patent No. 3,441,838 Dated April 29, 1969

Inventor(s) Antoine Salvi

It is certified that error appears in the above-identified patent and that said Letters Patent are hereby corrected as shown below:

Column 8, line 69, that portion of claim 3 reading "solvent" should read -- paramagnetic substance --; Column 8, line 74, that portion of claim 3 reading "solvent" should read -- paramagnetic substance --.

SIGNED AND SEALED AUG 25 1970

(SEAL)
Attest:

Edward M. Fletcher, Jr.
Attesting Officer

WILLIAM E. SCHUYLER, JR.
Commissioner of Patents